United States Patent [19]
Delorme et al.

[11] Patent Number: 5,699,827
[45] Date of Patent: Dec. 23, 1997

[54] LAWN TREATMENT APPARATUS FOR AN UNDERGROUND SPRINKLER SYSTEM

[76] Inventors: Virgil A. Delorme, 23615 ½ Hillview Rd., San Bernardino, Calif. 92404; Thomas Crisofulli, 13066 Balboa La., Moreno Valley, Calif. 92553; Madelyn Joy Warner, 3908 Oakwood Pl., Riverside, Calif. 92506

[21] Appl. No.: 715,073

[22] Filed: Sep. 19, 1996

[51] Int. Cl.$^6$ .................................................. B01D 11/02
[52] U.S. Cl. ........................ 137/268; 422/283; 239/310
[58] Field of Search ........................... 137/268; 422/283, 422/261, 281; 239/310

[56] References Cited

U.S. PATENT DOCUMENTS

| | | | |
|---|---|---|---|
| 4,635,848 | 1/1987 | Little | 239/310 X |
| 4,729,399 | 3/1988 | Wetzel et al. | 137/268 |
| 4,881,568 | 11/1989 | Ho | 137/268 |
| 5,259,409 | 11/1993 | Cervola | 137/268 |
| 5,441,073 | 8/1995 | Hoadley | 137/268 |

*Primary Examiner*—Kevin Lee
*Attorney, Agent, or Firm*—Michael I. Kroll

[57] ABSTRACT

A lawn treatment apparatus (10) for an underground sprinkler system (12) on a lawn (14). The system (12) is fabricated out of a durable plastic material (15) and includes an inlet pipe (16) with a water control valve (18) connected to an outlet pipe (20) with an anti-siphon valve assembly (22), having an anti-siphon valve housing (24) with an externally threaded mouth (26) and an internally threaded anti-siphon valve cap (28) carrying an anti-siphon valve (30). The apparatus (10) comprises a body member (32) having an open bottom end (34) and an open top end (36). A structure (38) is for securing the open bottom end (34) of the body member (32) to the externally threaded mouth (26) on the anti-siphon valve housing (24). A facility (40) is disposed in the body member (32) for mixing a chemical deposited within the body member (32) with a water flow traveling from the inlet pipe (16) into the anti-siphon valve assembly (22) and out through the outlet pipe (20) in the underground sprinkler system (12), so that the chemical can be sprayed onto the lawn (14). An element (42) is for retaining the open top end (36) of the body member (32) to the internally threaded anti-siphon valve cap (28), so that the anti-siphon valve (30) can make contact with the chemical mixing facility (40), to prevent the water with the chemical from backing up into the water supply.

3 Claims, 3 Drawing Sheets

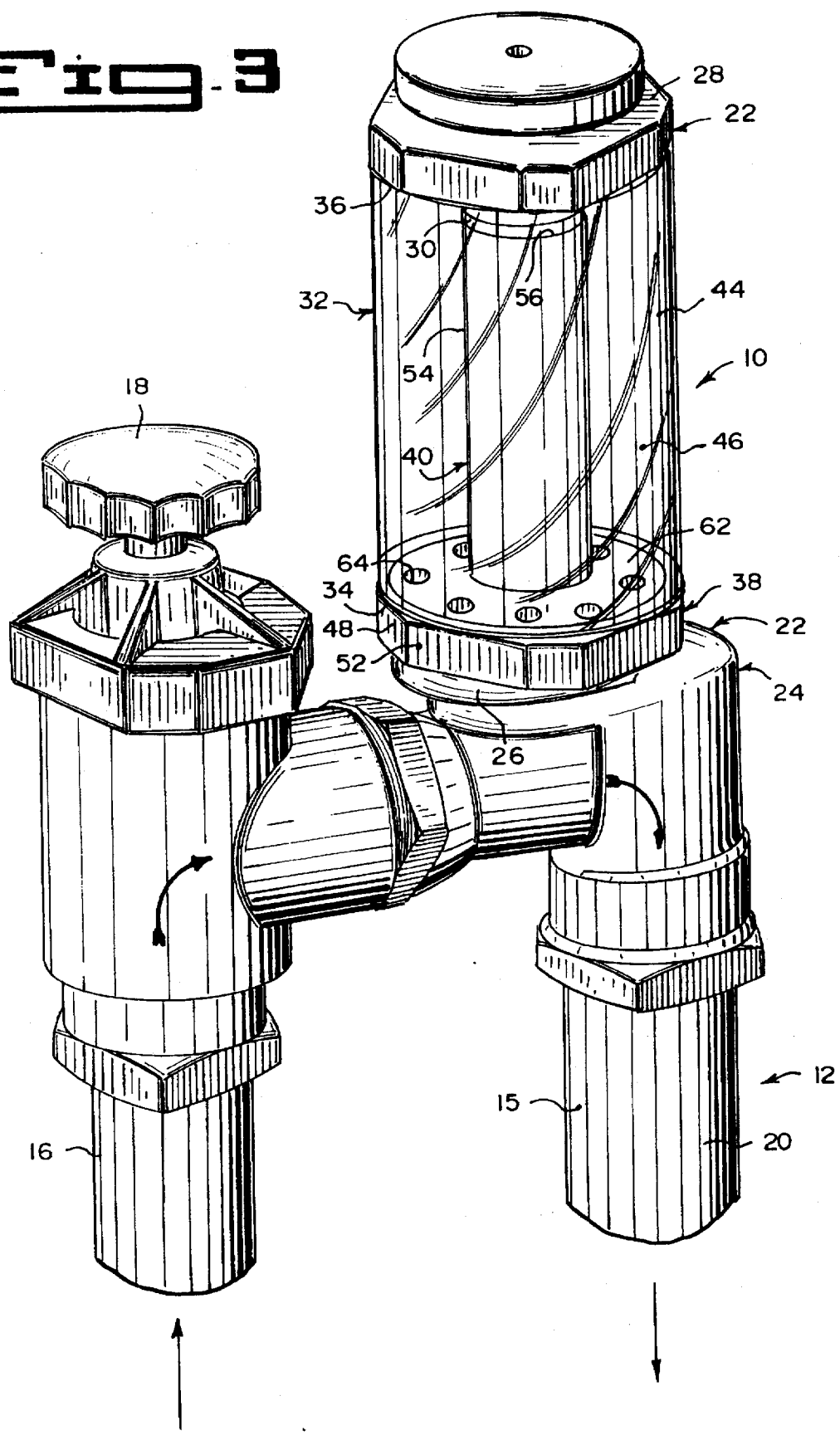

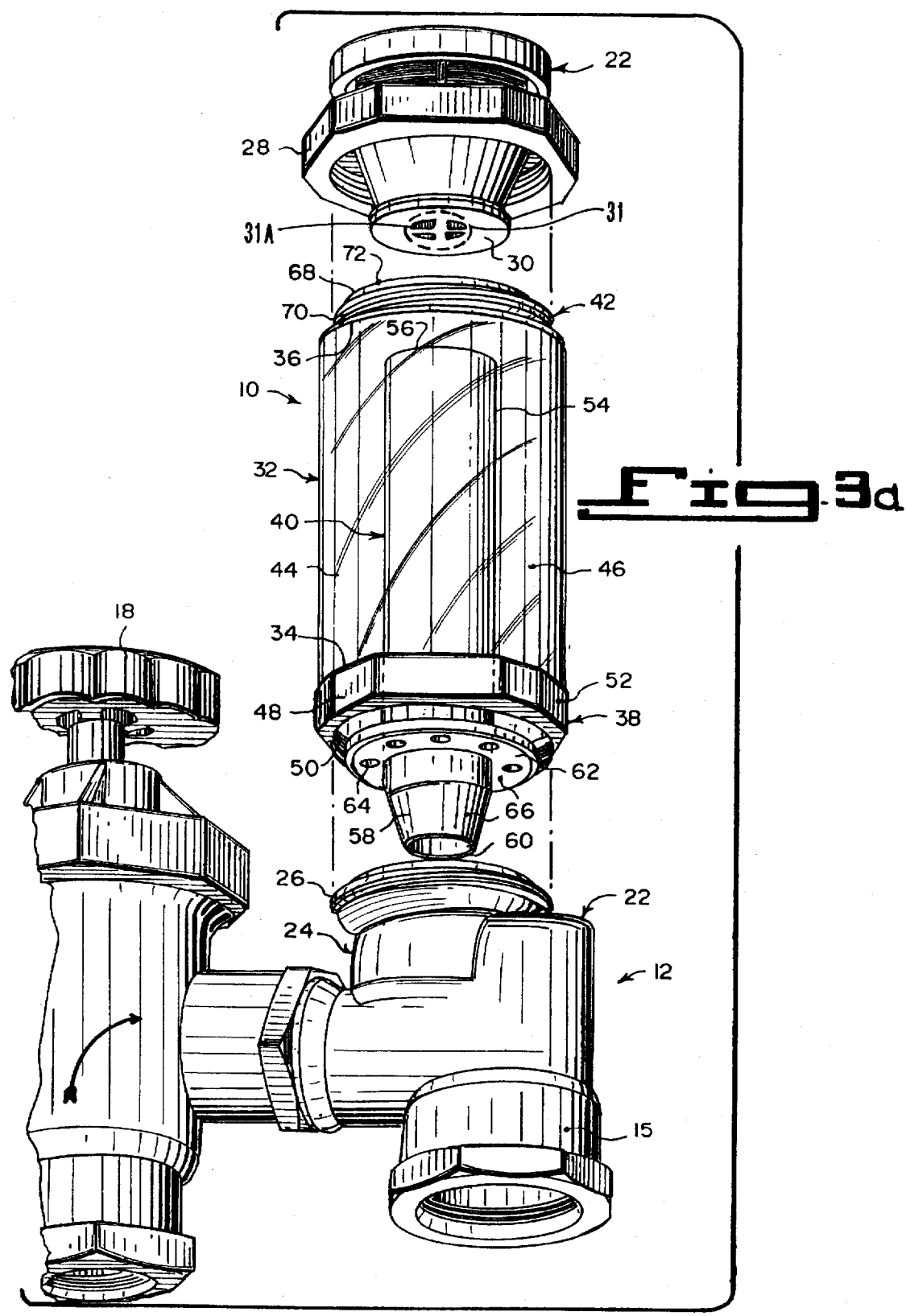

LAWN TREATMENT APPARATUS FOR AN UNDERGROUND SPRINKLER SYSTEM

BACKGROUND OF THE INVENTION

1. Field of the Invention

The instant invention relates generally to dispensing assemblies and more specifically it relates to a lawn treatment apparatus for an underground sprinkler system.

2. Description of the Prior Art

Numerous dispensing assemblies have been provided in prior art. For example, U.S. Pat. Nos. 5,259,409 to Cervola; 5,303,729 to DeMarco; 5,366,159 to Childers and 5,441,073 to Hoadley all are illustrative of such prior art. While these units may be suitable for the particular purpose to which they address, they would not be as suitable for the purposes of the present invention as heretofore described.

CERVOLA, WILLIAM F.

FERTILIZER MIXING CHAMBER

U.S. Pat. No. 5,259,409

A chamber including a connector for mixing water and any of a variety of dehydrated plant chemicals such as fertilizer or insecticide. The mixing chamber is attached to an existing anti-siphon valve assembly by a connector. The connector attaches the chamber to the anti-siphon valve assembly and has a number of water entry and exit ports which pass through the connector and permit water to enter the chamber from the anti-siphon valve assembly. This permits water to effectively mix with the dry chemicals and then have the water-chemical solution forced from the chamber and applied to vegetation by a sprinkler system. The anti-siphon valve prohibits the water-chemical solution from contaminating the central water supply. The connector is an improvement over previous devices as the number of entry and exit ports have been increased, and also the configuration of the ports may be varied.

DeMARCO, PETER

LAWN CARE CHEMICAL DELIVERY DEVICE

U.S. Pat. No. 5,303,729

An automatic fertilizing device for introducing lawn care chemicals such as fertilizer, herbicides, insecticides and fungicides into a sprinkler system. A container has a control plate insert to divide the container into an upper and lower volume. The container and control plate are mounted to a flow head. The flow head controls the amount of chemicals drawn from the container and dispersed into the main water line. This device may also be employed in pool systems for dispersing chlorine.

CHILDERS, LANCE L.

AUTOMATIC LAWN AND GARDEN FEEDING APPARATUS

U.S. Pat. No. 5,366,159

An automatic fertilizing apparatus which injects fertilizer directly into the waterstream of a sprinkler system. Each time the sprinkler system is activated, a predetermined amount of fertilizer is dispensed into the waterstream. The apparatus can be controlled to dispense fertilizer only thru sprinkler lines determined by the user.

HOADLEY, FRANCIS B.

APPARATUS FOR CONTROLLED RELEASE OF AN ERODIBLE SOLID INTO A LIQUID

U.S. Pat. No. 5,441,073

A dispenser assembly provides for a hydro-injected venturi release of an erodible solid into a liquid. This dispenser assembly regulates the flow of a fluid direction and pressure through an activation chamber which contains a chemical capsule, and provides adequate levels of solution concentration. The dispenser assembly consists of a lower body member, an upper body member which contains the activation chamber, and a hydro-injector venturi assembly. The hydro-injector venturi assembly controls the rate of pressure of a fluid entering the upper body member into the activation chamber as well as the flow out of the chamber by means of a venturi plate.

SUMMARY OF THE INVENTION

A primary object of the present invention is to provide a lawn treatment apparatus for an underground sprinkler system that will overcome the shortcomings of the prior art devices.

Another object is to provide a lawn treatment apparatus for an underground sprinkler system that is directly fluidly connected into an existing anti-siphon valve assembly in the underground sprinkler system.

An additional object is to provide a lawn treatment apparatus for an underground sprinkler system that will release in controlled amounts a replaceable dry chemical into the water supply of the underground sprinkler system.

A further object is to provide a lawn treatment apparatus for an underground sprinkler system that is simple and easy to use.

A still further object is to provide a lawn treatment apparatus for an underground sprinkler system that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

Various other objects, features and attendant advantages of the present invention will become more fully appreciated as the same becomes better understood when considered in conjunction with the accompanying drawings, in which like reference characters designate the same or similar parts throughout the several views, and wherein;

FIG. 3 is an enlarged top perspective view of the area indicated by arrow 3 in FIG. 1.

FIG. 3a is an enlarged partly exploded bottom perspective view, showing the various components in greater detail.

3

Figure 1:
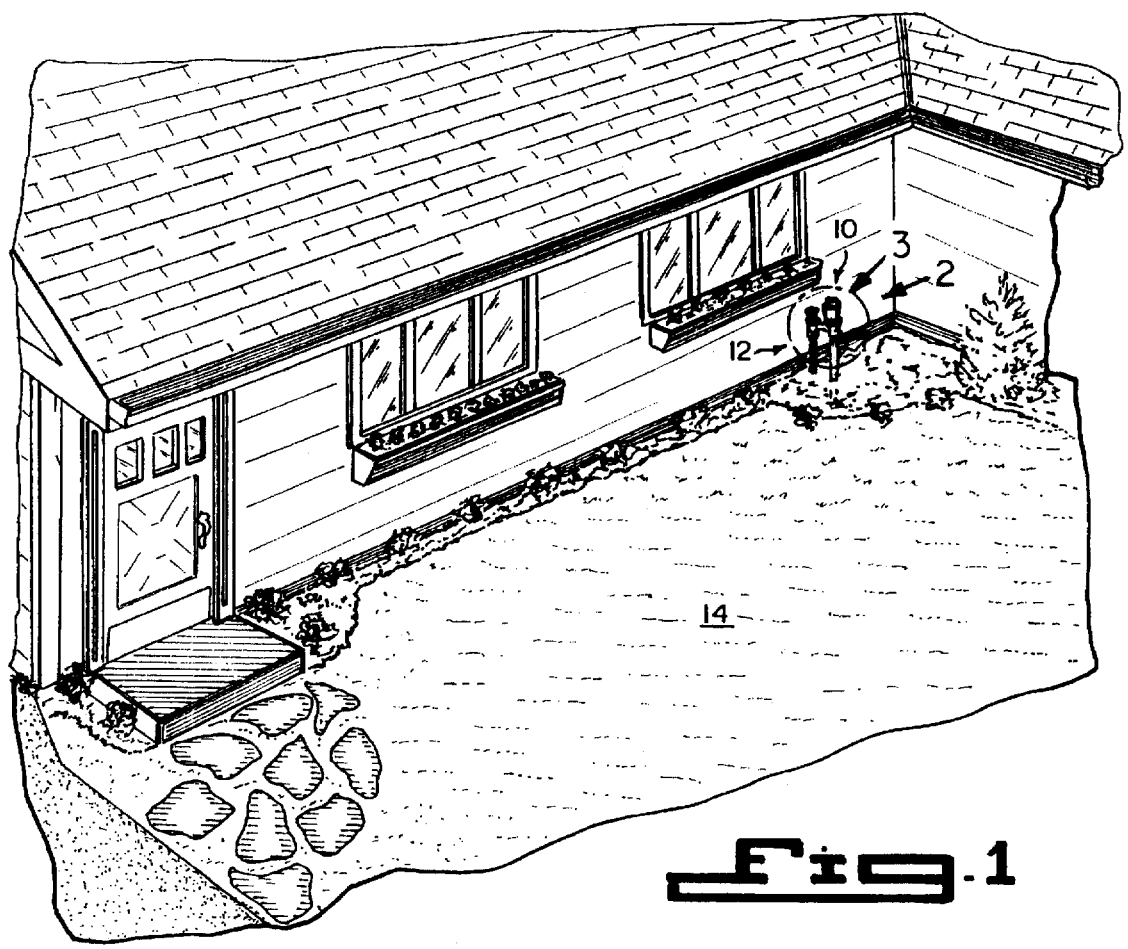
FIG. 1 is a perspective view showing the instant invention installed into an underground sprinkler system in a front yard of a house.

Similar reference characters denote corresponding features consistently throughout the attached drawings.

DETAILED DESCRIPTION OF THE PREFERRED EMBODIMENTS

Figure 2:
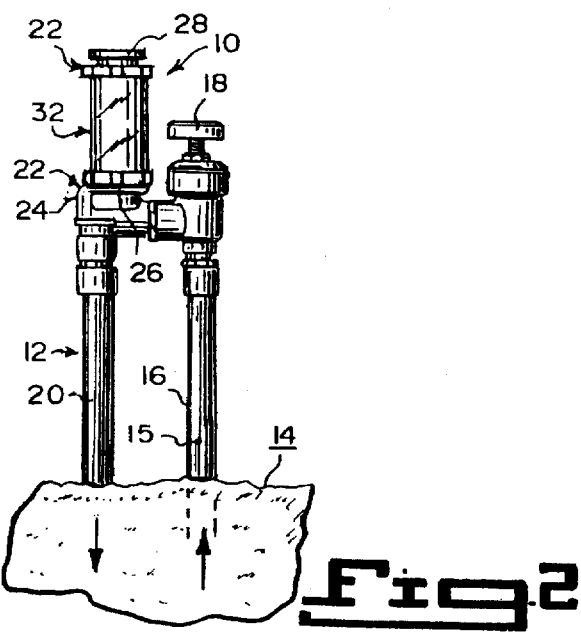
FIG. 2 is an elevational view taken in the direction of arrow 2 in FIG. 1.

Turning now descriptively to the drawings, in which similar reference characters denote similar elements throughout the several views, FIGS. 1 through 3a illustrate a lawn treatment apparatus 10 for an underground sprinkler system 12 on a lawn 14. The system 12 is fabricated out of a durable plastic material 15 and includes an inlet pipe 16 with a water control valve 18 connected to an outlet pipe 20 with an anti-siphon valve assembly 22, having an anti-siphon valve housing 24 with an externally threaded mouth 26 and an internally threaded anti-siphon valve cap 28 carrying an anti-siphon valve 30 which can employ a plate 31 above openings 31a acting as a check valve.

The apparatus 10 comprises a body member 32, having an open bottom end 34 and an open top end 36. A structure 38 is for securing the open bottom end 34 of the body member 32 to the externally threaded mouth 26 on the anti-siphon valve housing 24.

A facility 40 is disposed in the body member 32, for mixing a chemical deposited within the body member 32 with the water flow traveling from the inlet pipe 16 into the anti-siphon valve assembly 22 and out through the outlet pipe 20 in the underground sprinkler system 12, so that the chemical can be sprayed onto the lawn 14. An element 42 is for retaining the open top end 36 of the body member 32 to the internally threaded anti-siphon valve cap 28, so that the anti-siphon valve 30 can make contact with the chemical mixing facility 40 to prevent the water with the chemical from backing up into the water supply.

The body member 32 is a cylindrical sleeve 44. The body member 32 is fabricated out of a durable transparent plastic material 46, so that a person can see the chemical mixing with the water flow, and when the chemical needs replacement therein.

The securing structure 38 is a base hex ring 48 having internal threads 50. The base hex ring 48 is attached to the open bottom end 34 of the body member 32. The internal threads 50 of the base hex ring 48 can engage with the externally threaded mouth 26 on the anti-siphon valve housing 24. The base hex ring 48 is fabricated out of a durable plastic material 52.

The chemical mixing facility 40 includes an elongated water flow tube 54, having a top outlet port 56 and a tapered bottom portion 58 with an inlet port 60. A control plate 62 has a plurality of exit holes 64 therethrough.

The control plate 62 is placed about the elongated water flow tube 54 above the tapered bottom portion 58. When the tapered bottom portion 58 is inserted into an entrance side of the anti-siphon valve housing 24, the control plate 62 will snugly fit into the securing structure 38. The elongated water flow tube 54 will extend centrally upwardly into the body member 32 with the chemical deposited thereabout within the body member 32. This allows the water flow to travel from the entrance side of the anti-siphon valve housing 24 up the elongated water flow tube 54, out from the top outlet port 56, mix with the chemical, go out through the exit holes 64 in the control plate 62 and into an exit side of the anti-siphon valve housing 24.

The control plate 62 is integral with the elongated water flow tube 54 above the tapered bottom portion 58. The control plate 62 can be permanently attached within the securing structure 38, so as to form one complete unit with the body member 32. The elongated water flow tube 54 and the control plate 62 are fabricated out of a durable plastic material 66.

The retaining element 42 is a collar 68 having external threads 70. The collar 68 is attached to the open top end 36 of the body member 32. The external threads 70 of the collar 68 can engage with the internally threaded anti-siphon valve cap 28. The collar 68 is fabricated out of a durable plastic material 72.

OPERATION OF THE INVENTION

To use the lawn treatment apparatus 10, the following steps should be taken:

1. Turn the water control valve 18 in the underground sprinkler system 12 to the closed position.
2. Unscrew the internally threaded anti-siphon valve cap 28 from the externally threaded mouth 26 on the anti-siphon valve housing 24.
3. Insert the tapered bottom portion 58 of the elongated water flow tube 54 into the entrance side of the anti-siphon valve housing 24.
4. Screw the base hex ring 48 with the internal threads 50 onto the externally threaded mouth 26 on the anti-siphon valve housing 24.
5. Place the chemical, which can be granulated fertilizer or powdered insecticide into the cylindrical sleeve 44 about the elongated water flow tube 54 and onto the control plate 62.
6. Screw the internally threaded anti-siphon valve cap 28 onto the external threads 70 on the collar 68.
7. Turn the water control valve 18 in the underground sprinkler system 12 to the opened position, to allow the water flow to mix with the chemical and sprayed onto the lawn 14.

It will be understood that each of the elements described above, or two or more together may also find a useful application in other types of methods differing from the type described above.

While certain novel features of this invention have been shown and described are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. Lawn treatment apparatus for delivering chemical to an underground sprinkler system comprising:
    a) a water inlet pipe having a water control valve connected to an outlet pipe for delivering water to said underground water sprinkler system, said outlet pipe having an anti-siphon valve assembly, said assembly having an anti-siphon valve housing with a threaded mouth and a threaded anti-siphon valve cap carrying an anti-siphon valve;
    b) a cylindrical, vertically extending body member having an open bottom end and an open top end mounted between said anti-siphon valve housing and said anti-siphon valve cap;

c) means for securing said open bottom end of said body member to the threaded mouth on the anti-siphon valve housing;

d) means disposed in said body member for mixing said chemical deposited within said body member with water flow traveling from the inlet pipe into the anti-siphon valve assembly and out through the outlet pipe to the underground sprinkler system, said mixing means comprising a vertically extending cylindrical tube located within said body member to form a space within said body member completely surrounding said tube, said tube having a top outlet port and a tapered bottom portion with an inlet port, and a control plate having a plurality of exit holes therethrough surrounding said elongated water flow tube above said tapered bottom portion, so that with said tapered portion extending into said anti-siphon valve housing, allowing water to travel from said inlet pipe into said anti-siphon valve housing, through said inlet port into and up said elongated water flow tube, out from said top outlet port through said anti-siphon valve, down through said body member around said flow tube mixing with said chemical, through said exit holes in said control plate and an exit side of the anti-siphon valve housing into said outlet pipe; and e) means for retaining said open top end of said body member to said anti-siphon valve cap, so that said anti-siphon valve prevents the water with the chemical from backing up into the water supply.

2. The lawn treatment apparatus of claim 1 in which said body member is fabricated out of a durable transparent plastic material so that a person can see the chemical mixing with the water flow and when the chemical needs replacement.

3. The lawn treatment apparatus of claim 2 in which said control plate is integral with said flow tube above said tapered bottom portion.

\* \* \* \* \*